May 21, 1940.  A. CURIONI  2,201,855
GASIFYING APPARATUS FOR FUEL OIL
Filed Dec. 30, 1937  2 Sheets-Sheet 1
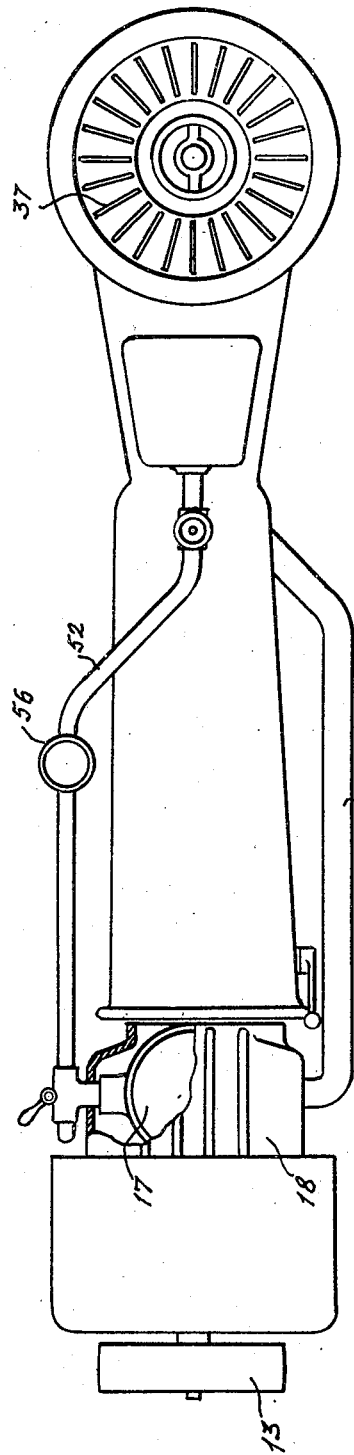
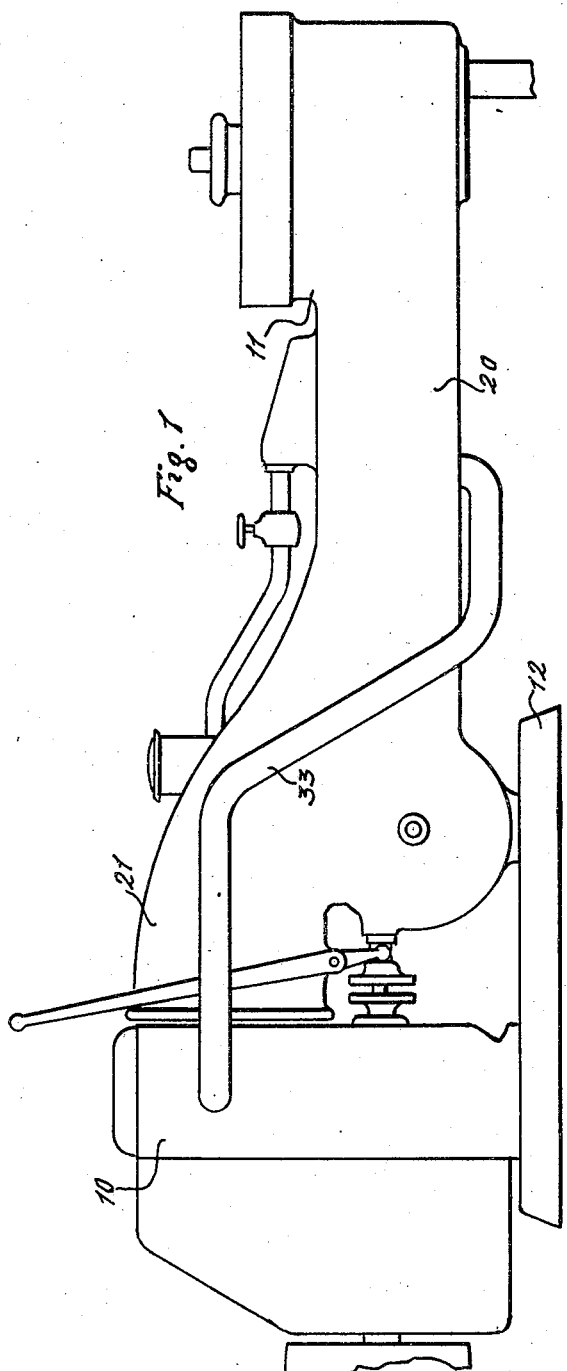
INVENTOR
Aldo Curioni
BY
Guido M. Laurdot
ATTORNEY May 21, 1940. A. CURIONI 2,201,855
GASIFYING APPARATUS FOR FUEL OIL
Filed Dec. 30, 1937 2 Sheets-Sheet 2
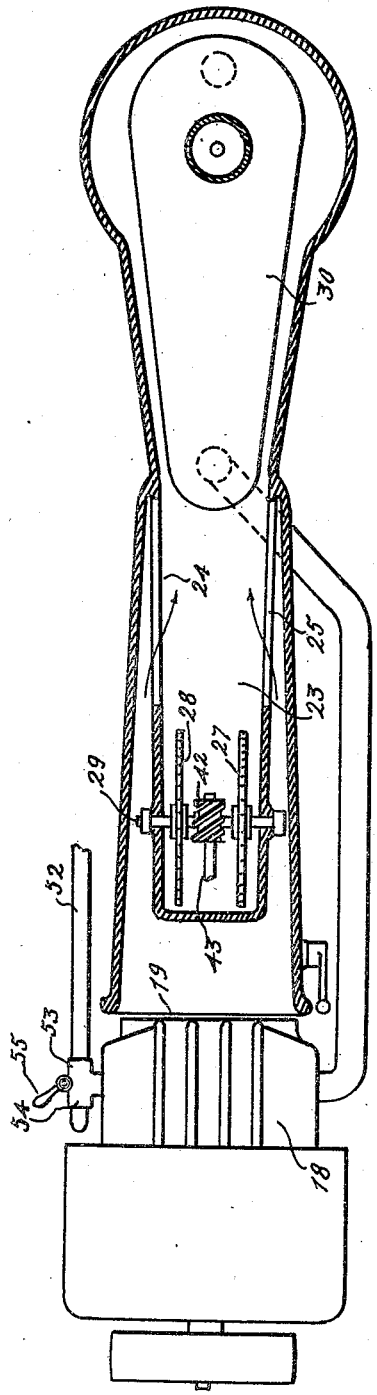
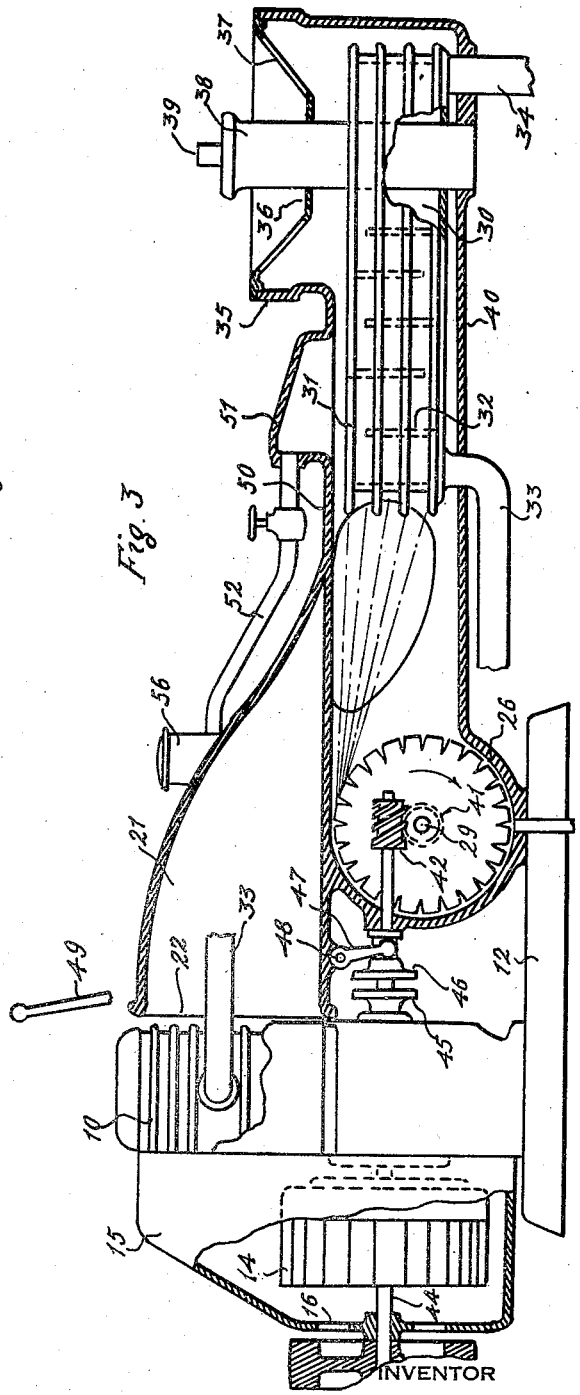
INVENTOR
Aldo Curioni
BY
ATTORNEY Patented May 21, 1940

2,201,855

UNITED STATES PATENT OFFICE 2,201,855

GASIFYING APPARATUS FOR FUEL OIL

Aldo Curioni, Katonah, N. Y., assignor to The Gasolaire Corporation, Mount Kisco, N. Y., a corporation of New York Application December 30, 1937, Serial No. 182,636

3 Claims. (Cl. 123—3)

This invention relates to gasifying apparatus and more particularly refers to improvements in devices, preferably in unitary form, for making it possible to utilize power and heat generated by an internal combustion engine for the operation of an oil gasifying apparatus.

My invention is especially intended for use on farms and in isolated dwellings where for any reason it is found desirable to produce power for lighting or other purposes. Electric generating plants for isolated dwellings and the like are extensively used in localities where public electric service is not available or where high rates make it more economical to run a private plant. These small generating plants generally consist of a gasoline engine directly connected to a dynamo generating the current required for lighting and for running such electric motors as may be needed for domestic and other purposes.

In such instances where an electric generating plant of the character mentioned is required, a gas generating plant for cooking and other purposes is usually also needed, and separate installations are usually made in order to provide these facilities. Many of these installations are based upon the use of liquefied hydrocarbon gases which require frequent servicing and are expensive to run.

Where an individual electric generating plant is used it is, of course, possible to employ for heating purposes an oil burner of the type described and claimed in my Patent No. 2,073,552 for "Oil gasifier and burner," in which an electric motor is employed for running an atomizing device for the fuel and a fan for supplying air to the air-fuel mixture, the fuel being projected against a vaporizer, preheated by electric heating means, and maintained at the vaporizing temperature by the flame of the burner.

However, it is obviously desirable to combine the power and heating plants in a single unit, not only because a saving in space can thus be effected, but also because material savings can be realized in the first cost and in the cost of installation as well as in the operating cost.

I have found that a unitary device enabling the user to produce both power and heat can be made in such compact form that it is adaptable for use not only on farms and other dwellings, but also on boats, trailers, and other places where a limited space is available.

In a broad sense my invention consists in coupling together an internal combustion engine and an oil gasifier and burner, the power and heat necessary for the operation of the latter being furnished by the engine, which is moreover preferably used for producing power for other purposes.

In the preferred form of my invention the oil gasifier is also used for generating gas adapted for running the engine even though the engine may be designed for use with a highly volatile fuel, such as gasoline.

The primary object of my invention, accordingly, is to provide a combination power and gas generating plant in which an internal combustion engine is coupled with a gas generating apparatus, the heat generated by the exhaust of the engine or by the cooling medium, or both, being utilized for assisting the vaporization of a volatile or vaporizable fuel, and the power being utilized for actuating the fuel atomizing and air supplying devices required for the operation of the gas generating apparatus, said plant preferably comprising a burner, or burners, forming an integral part of the gas generating apparatus for the direct combustion of the gas generated thereby.

Another object is to provide a combination engine and oil gasifying apparatus, in which a gasoline or similar engine is directly connected to and drives the moving parts of the oil gasifier, and in which the heat of the exhaust is utilized for heating and maintaining a vaporizer at a temperature sufficient to vaporize the oil fuel used.

A further object is to provide a combination engine and oil gasifying apparatus in which a gasoline or similar engine is employed to drive the moving parts of the oil gasifier, the cooling air displaced by the fan, forming part of the engine's equipment, being supplied to the oil gasifier for the purpose of forming an air-fuel mixture and the exhaust being utilized for heating and maintaining a vaporizer at a temperature sufficient to vaporize the oil fuel used.

A still further object is to provide a combination gasoline engine and oil gasifying apparatus in which the power and heat generated by the engine are utilized for the operation of the oil gasifier and the lighter vaporized fractions of the oil fuel used in the burner are utilized for the operation of the engine.

Other objects and advantages of the present invention will more fully appear as the description proceeds and will be set forth and claimed in the appended claims.

My invention is illustrated by way of example in the accompanying drawings, in which:

Fig. 1 is a side view in elevation of a combination engine and gasifier, embodying my invention;

Fig. 2 is a plan view thereof, with parts broken away and sectioned;

Fig. 3 is a vertical longitudinal section of the same; and

Fig. 4 is a plan view thereof, with the oil gasifier shown in section.

The combination engine and gasifier illustrated comprises an internal combustion engine, preferably a gasoline engine, 10, and an oil gasifier 11, mounted on a common base 12, the gasoline engine being of a type currently used in connection with small electric generating plants in which a dynamo is directly connected to the engine or else is driven by means of a pulley 13.

The engine is of the air cooled type, equipped with a fan 14, housed within an enclosure 15, having air inlets 16, directing the air delivered by the fan against and around the cylinder 17. To this end, the enclosure is formed with an extension 18, constituting an enclosure for the cylinder, said enclosure being provided with an outlet 19.

The oil gasifier used is shown of a type somewhat similar to that described and claimed in my Patent No. 2,073,552, above referred to, and comprises an elongated casing 20, the inner end of which is provided with a conduit 21, the open end 22 of which faces the outlet 19 of extension 18.

Conduit 21 thus forms an air supply chamber which communicates with the fuel chamber 23 by means of openings 24, 25, provided in the walls of said fuel chamber.

Said fuel chamber is formed by the rear extension of the casing and is depressed at the rear to form a well 26, within which is submerged the lower portion of two impeller wheels 27, 28, mounted on a transversal shaft 29.

In the front portion of the fuel chamber, which forms the vaporizing chamber proper, is housed an exhaust collecting chamber, 30, the wall of which is formed with a number of horizontal peripheral ribs 31, and the inside of which is preferably provided with a number of baffle plates, shown in dotted lines at 32, said baffle plates causing the exhaust gases reaching the rear end of the exhaust collecting chamber through a conduit 33 to follow a sinuous passage until they are discharged at the front of the said collecting chamber through a discharge conduit 34. The front end of the casing extends vertically to form the body 35 of a burner, the open top of said body 35 being equipped with a depressed cup 36, having a number of radial slots 37 forming the burner outlets through which the gases generated within the vaporizing chamber issue to be directly burned.

A heating element 38 extends vertically through the center of the burner and through the exhaust collecting chamber, so that the lower end of said element comes directly in contact with the exhaust gases on their way to the discharge conduit 34 and its upper end remains directly in contact with the flame generated by the burner.

An igniting element 39 is preferably provided centrally of the heating element, said igniting element serving both as a preheater for the heating element and as an igniter for the gases when they start issuing from the slots 37.

When shaft 29, carrying the impeller wheels, is rotated in a clockwise direction, as indicated by the arrow in Fig. 3, the impeller wheels will atomize and direct fuel against the outer wall of the exhaust collecting chamber, and said fuel will become distributed in thin films along the wide surface provided by the peripheral extension of the ribs 31, which are heated by the exhaust gases passing through the collecting chamber. Said ribs together with the heating element form the vaporizer, causing the fuel to become vaporized practically in its entirety as it nears the front end of the casing, said fuel having in the meantime become mixed with the air supplied through conduit 21 and openings 24, 25, and forming therewith a combustible air-fuel mixture which will issue in gaseous form through slots 37. If any portion of the fuel should remain unvaporized it will fall to the bottom 40 of the vaporizing chamber, said bottom being rearwardly inclined and leading said fuel back to the fuel well 26, where it is immediately once more picked up by the impeller wheels and redirected in atomized form within the vaporizing chamber. Said fuel having been previously heated through its passage through the vaporizing chamber will be more easily vaporized when it is projected within said chamber a second or third time, so that the fuel is eventually vaporized practically in its entirety and the heavier fractions thereof are prevented from returning to the source of supply.

This mode of operation is in accordance with that explained in my Patent No. 2,073,552, above referred to, and has the advantage of preventing the gradual impoverishment of the fuel by the returned heavier fractions, thus insuring the generation of a gas of uniform composition.

It will be observed that the ribs 31 extend outwardly of the exhaust collecting chamber sufficiently to form relatively wide peripheral platforms upon which the fuel projected by the impeller wheels will spread in relatively thin films so that a good vaporization thereof is assured.

Shaft 29, carrying the impeller wheels, may be driven by a set of helical gear wheels, one of which, 41, is mounted on said shaft and the other, 42, is mounted on a longitudinal shaft 43, coaxial with shaft 44 of the engine. Said shaft 43 may be connected to shaft 44 by means of a clutch 45—46, the movable member 46 of said clutch being controlled by an arm 47, carried by a transversal shaft 48, in its turn actuated by a hand lever 49.

The very high temperature at which the exhaust is discharged from the engine has, in practice, been found sufficient to heat and maintain the vaporizer at the proper vaporizing temperature, so that, if desired, the heating element 38 can be omitted, as well as the electric igniting element 39, an ordinary match being used for igniting the gases as they begin to issue through slots 37. However, in practice, the use of a heating and igniting element represents a convenience which in the majority of cases does not complicate the installation of the device to any objectionable extent, because, as a rule, the engine is used to run a dynamo connected to a storage battery, so that an electric current supply is usually available.

In such case, in order to start the operation of the burner it is sufficient to set clutch 45—46 in its inoperative position shown in the drawings when the engine is started and then to render said clutch operative when the vaporizer has had a chance to become sufficiently hot.

In my other application for patent, entitled "Self-contained gas generating plant," Serial No. 181,591, I have described a combination internal combustion engine and gasifying apparatus, in which a highly volatile fuel, such as gasoline, is used in the gasifying apparatus. Due to the volatility of the fuel I have in that case found it advisable to cut off the air and heat supplied to the gasifying apparatus when the impeller wheels are disconnected from the engine. Similar arrangements can also be used in the present case, if desired, but they can be omitted without any serious disadvantage because the oil fuel will not vaporize unless it is actually projected against the hot surface of the vaporizer.

In said co-pending application I have also described an arrangement whereby the quantity of air supplied to the vaporizing chamber may be adjusted in order to regulate the strength of the air-fuel mixture, and although such an arrangement has not been shown in the present case, it is to be understood that an adjustable air valve can also be employed if desired.

An important feature of the combination engine and gasifying apparatus forming the subject of this invention is that it provides a means whereby an engine designed for use in connection with gasoline or some other highly volatile fuel may be operated by the gases generated in the vaporizing chamber of the gasifier even though oil fuel may be used for the operation of the latter.

This is made possible by the fact that when the oil fuel is projected against the hot surface of the vaporizer, it undergoes a fractional distillation whereby the lighter fractions will be immediately vaporized as the oil particles strike the vaporizer surface, while the heavier fractions will be successively vaporized as they spread upon the hot surfaces of the ribs 31.

I, therefore, prefer to form the upper wall 50 of casing 20 with a dome 51, located in advance of the burner 35 just above the rear portion of the exhaust collecting chamber or vaporizer. Said dome is connected by a pipe 52 with the intake port of the engine through the intermediary of a T-fitting 53, one end of which, 54, is connected to an ordinary carbureter (not shown). Said T-fitting is provided with a valve, controlled by a handle 55, which is adapted to connect the intake port of the engine with the carbureter or with pipe 52, so that the engine can be started with the ordinary carbureter and when fuel vapors begin to be generated within the burner handle 55 can be caused to move the valve to the position where the carburetor will be cut off and the suction of the engine will act upon the vapors collecting within dome 51.

As stated, such vapors will be the result of the vaporization of the lighter fractions of the fuel and will, therefore, be free from tar and other objectionable impurities that might interfere with the operation of a gasoline engine; however, if desired, increased safety in this respect can be obtained by inserting a suitable purifier 56 in part 52.

Although the change from carbureter to gasifier-vapor operation of the engine is shown as being effected by manual control, it will be understood that a thermostatic system of control such as I have described and claimed in my co-pending application for "Self-contained gas generating plant," above referred to, can be used instead also in the present case.

It is also to be understood that although in the drawings I show a type of gasifier which is somewhat similar to that described and claimed by me in my Patent No. 2,073,552 for "Oil gasifier and burner," above referred to, my invention can also be applied in connection with other types of gasifiers.

It is thus seen that by virtue of my invention I provide a novel and improved apparatus whereby a gasifying apparatus for fuel oil can be combined with an internal combustion engine so as to utilize heat generated by the engine which would otherwise be lost, the engine itself providing a means for actuating the fuel atomizing and other mechanically controlled elements of the gasifier, while the power generated by it remains available for other purposes practically in its entirety.

It is obvious that the constructional details of my invention may vary from those shown without departing from the inventive idea. The drawings should, therefore, be understood as being intended for illustrative purposes only and not in a limiting sense.

I, accordingly, reserve the right to carry my invention into practice in all those ways and manners which may enter, fairly, into the scope of the appended claims.

I claim:

1. A gasifying apparatus for fuel oil comprising the combination of an internal combustion engine and a fuel gasifier, said gasifier having a vaporizing chamber provided with an outlet for the fuel-air mixture issuing from said chamber, a vaporizer within said chamber consisting of a hollow metallic body having a vertical series of fins integral therewith and laterally extending therefrom, a fuel oil well in front of said chamber, an impeller wheel having its lower part submerged within said well and operating to diffuse and project fuel oil directly against said vaporizer, said gasifier having an enlarged air inlet closely adjacent the engine and leading to the vaporizing chamber, said engine having a cooling fan supplying air to said air inlet, means for operatively connecting said impeller wheel to said engine, and means for directing the exhaust gases issuing from said engine to a point of discharge through said vaporizer.

2. A gasifying apparatus for fuel oil comprising the combination of an internal combustion engine and a fuel gasifier, said gasifier having a vaporizing chamber provided with an outlet for the fuel-air mixture issuing from said chamber, a vaporizer within said chamber consisting of a hollow metallic body having a vertical series of fins integral therewith and laterally extending therefrom, a fuel oil well in front of said chamber, an impeller wheel having its lower part submerged within said well and operating to diffuse and project fuel oil directly against said vaporizer, said gasifier having an enlarged air inlet closely adjacent the engine and leading to the vaporizing chamber, said engine having a cooling fan supplying air to said air inlet, means for operatively connecting said impeller wheel to said engine, means for directing the exhaust gases issuing from said engine to a point of discharge through said vaporizer, a dome upwardly extending from said vaporizing chamber adapted to collect vapors resulting from the initial distillation of said fuel oil, and means for connecting the intake of said engine to said dome.

3. A gasifying apparatus for fuel oil comprising the combination of an internal combustion engine and a fuel gasifier, said gasifier having a vaporizing chamber provided with an outlet for the fuel-air mixture issuing from said chamber, a vaporizer within said chamber consisting of a hollow metallic body having a vertical series of fins integral therewith and laterally extending therefrom, a fuel oil well in front of said chamber, an impeller wheel having its lower part submerged within said well and operating to diffuse and project fuel oil directly against said vaporizer, said gasifier having an enlarged air inlet closely adjacent the engine and leading to the vaporizing chamber, said engine having a cooling fan supplying air to said air inlet, means for operatively connecting said impeller wheel to said engine, means for directing the exhaust gases issuing from said engine to a point of discharge through said vaporizer, a dome upwardly extending from said vaporizing chamber adapted to collect vapors resulting from the initial distillation of said fuel oil, means for connecting the intake of said engine to said dome, and means for returning undistilled fuel from the vaporizing chamber to the fuel oil well.

ALDO CURIONI.